(12) United States Patent
Huber et al.

(10) Patent No.: US 8,157,050 B2
(45) Date of Patent: Apr. 17, 2012

(54) DEVICE FOR REDUCING NOISE GENERATED BY AN AIRCRAFT JET ENGINE WITH CURVE DUCTS

(75) Inventors: Jerome Huber, Toulouse (FR); Jean-Paul Bonnet, Poitiers (FR); Joel Delville, Poitiers (FR); Peter Jordan, Rom (FR); Francois Strekowski, Poitiers (FR)

(73) Assignees: Airbus Operations (S.A.S.), Toulouse (FR); Centre National de la Recherche Scientifique (CNRS), Paris (FR); Universitéde Poitiers, Poitier (FR)

( * ) Notice: Subject to any disclaimer, the term of this patent is extended or adjusted under 35 U.S.C. 154(b) by 0 days.

(21) Appl. No.: 12/935,423

(22) PCT Filed: Mar. 31, 2009

(86) PCT No.: PCT/FR2009/000374
§ 371 (c)(1),
(2), (4) Date: Sep. 29, 2010

(87) PCT Pub. No.: WO2009/133271
PCT Pub. Date: Nov. 5, 2009

(65) Prior Publication Data
US 2011/0042162 A1    Feb. 24, 2011

(30) Foreign Application Priority Data
Mar. 31, 2008 (FR) ..................... 08 52120

(51) Int. Cl.
*F01K 1/14* (2006.01)
(52) U.S. Cl. ............... 181/220; 244/1 N; 239/265.13
(58) Field of Classification Search ............ 181/220; 244/1 N; 239/265.13
See application file for complete search history.

(56) References Cited

U.S. PATENT DOCUMENTS
4,501,393 A * 2/1985 Klees et al. ............ 239/265.13
(Continued)

FOREIGN PATENT DOCUMENTS
EP    1 580 417    9/2005
(Continued)

OTHER PUBLICATIONS

Alkislar, M. B. "Significant Improvements On Jet Noise Reduction By Chevron-Microjet Combination (AIAA 2007-3598)", 13th AIAA/CEAS Aeroacoustics Conference (28th AIAA CEAS Aeroacoustics Conference), pp. 1-8, (May 21-23 2007) XP 002518551.

(Continued)

*Primary Examiner* — Forrest M Phillips
(74) *Attorney, Agent, or Firm* — Oblon, Spivak, McClelland, Maier & Neustadt, L.L.P.

(57) ABSTRACT

A jet engine, including a wall surrounding a first gas flow ejected from a downstream end of the wall along a longitudinal axis, a second flow of gas running outside the wall in a direction of ejection of the first gas flow, at least one duct arranged on the periphery of the downstream end of the wall which is desired to eject a gas flow for interacting with one and/or the other gas flow, the at least one duct including a terminal section provided at the free end thereof with an outlet opening through which the fluid is ejected. The terminal section successively includes a first section of straight duct aligned along a median axis and a second duct section forming a bend relative to the straight section, the second portion having a free end provided with the outlet opening and sufficiently close to the median axis of the first section to give the terminal section a reduced restriction in a direction of formation of the bend.

14 Claims, 5 Drawing Sheets

U.S. PATENT DOCUMENTS

| | | | |
|---|---|---|---|
| 5,947,412 A * | 9/1999 | Berman | 244/1 N |
| 6,786,038 B2 * | 9/2004 | Lair | 60/226.1 |
| 7,159,383 B2 * | 1/2007 | Barton et al. | 60/226.1 |
| 2008/0134665 A1 * | 6/2008 | Birch et al. | 60/226.3 |
| 2008/0236167 A1 * | 10/2008 | Dussillols et al. | 60/771 |
| 2008/0271431 A1 | 11/2008 | Porte | |
| 2009/0320487 A1 | 12/2009 | Alkislar et al. | |
| 2010/0037587 A1 | 2/2010 | Vauchel et al. | |
| 2010/0065680 A1 | 3/2010 | Huber et al. | |

FOREIGN PATENT DOCUMENTS

| | | |
|---|---|---|
| EP | 1 936 172 | 6/2008 |
| FR | 1 542 668 | 10/1968 |
| FR | 2 872 549 | 1/2006 |
| FR | 2 892 152 | 4/2007 |
| FR | 2 901 321 | 11/2007 |
| WO | 2008 100712 | 8/2008 |

OTHER PUBLICATIONS

Henderson, K. et al., "The Impact Of Fluidic Chevrons On Jet Noise (AIAA 2005-2888)" 11$^{th}$ AIAA/CEAS Aeroacoustics Conference (26$^{th}$ AIAA Aeroacoustics Conference), pp. 1-13, (May 23-25, 2005), XP-002518551.

International Search Report issued Aug. 26, 2010 in PCT/FR09/00374 filed Mar. 31, 2009.

U.S. Appl. No. 12/935,450, filed Sep. 29, 2010, Huber, et al.

U.S. Appl. No. 12/935,445, filed Sep. 29, 2010, Huber, et al.

* cited by examiner

DEVICE FOR REDUCING NOISE GENERATED BY AN AIRCRAFT JET ENGINE WITH CURVE DUCTS

BACKGROUND

I. Field of the Disclosure

The invention relates to an aircraft jet engine.

In known manner, an aircraft jet engine comes in the form of a nacelle in the center of which a turbomachine is positioned.

This nacelle is intended to be installed under the wing group of an aircraft by means of an engine nacelle pylon.

The turbomachine consists of a gas generator that drives a fan installed on the shaft of the gas generator, upstream from the latter along the longitudinal direction of the jet engine nacelle.

The air stream that passes longitudinally through the nacelle penetrates partially into the gas generator and takes part in combustion.

This stream is called primary stream and is ejected at the outlet of the generator.

The part of the air stream penetrating into the nacelle and that does not pass through the gas generator is carried along by the fan.

This stream, called secondary stream, flows in an annular passage, concentrically in relation to the primary stream. This passage is formed between an outer longitudinal wall (nacelle wall) and an inner longitudinal wall surrounding the gas generator.

The secondary stream is ejected from the nacelle at the downstream end of the outer wall of the latter along the more or less longitudinal direction of the jet engine.

The inner wall surrounding the generator for the gas also defines with an inner longitudinal part an annular passage through which the primary stream flows.

This stream is ejected at the downstream end of the inner wall that surrounds the gas generator.

During take-off phases, the gas stream that is ejected (primary and secondary stream) takes on very high speeds. At these speeds, the meeting of the ejected stream with the surrounding air, as does the meeting of the primary stream and the secondary stream, generates a considerable noise.

II. Description of Related Art

A fluidic device for reduction of noise generated by an aircraft jet engine is known from international application WO2002/013243.

This device comprises several pairs of ducts opening into the outlet of a nozzle of the jet engine ejecting a propulsive jet and which are distributed around the periphery of this nozzle.

The ducts of each pair each eject an air jet and are disposed in convergent manner in relation to each other in order to generate at the outlet a triangle of interaction of the air jets.

The angle of convergence of the ducts is between 40 and 70°.

Furthermore, the jets are slanted along an angle referred to as penetration angle toward the longitudinal axis of the jet engine along which the gas stream is ejected.

This angle allows the jets ejected by the ducts to penetrate into the interior of the gas stream coming out of the nozzle of the jet engine.

This angle corresponds, for example, to the slant on the longitudinal axis of the trailing edge of the downstream end of the nozzle, insofar as the ducts are arranged in their terminal portion along this slanted edge.

BRIEF SUMMARY

The Applicant became aware, however, that with an increase in the value of the penetration angle the jets interact more with the gas stream ejected from the nozzle, which further contributes to reducing the noise generated. This effect has been noted in particular for angles on the order of several tens of degrees.

Nonetheless, the presence of the beveled trailing edge of the nozzle (outlet lip) makes the choice of the penetration angle and in particular its increase, difficult.

Consequently, it would be advantageous to be able to easily adapt the penetration angle of the ducts to the desired application, taking into account environmental constraints (example: beveled trailing edge of the nozzle).

Moreover, when it is desired to integrate the ducts into the thickness of the wall of the nozzle, it is difficult to select the desired penetration angle considering these integration constraints.

This is all the more true if it is wished to reduce the space requirement generated by the ducts.

Furthermore, it also could be advantageous to have, in association with the downstream end of the jet engine nozzle, a duct configuration making it possible to orient the jet coming out of the duct in controlled manner, in a chosen direction, and with a reduced space requirement.

This invention is intended to remedy at least one of the aforementioned drawbacks and/or to achieve one of the aforementioned objectives by proposing an aircraft jet engine comprising a wall surrounding a first gas stream that is ejected at a downstream end of the wall along a longitudinal axis XX', a second gas stream flowing outside the wall in the direction of ejection of the first gas stream, at least one duct arranged at the periphery of the downstream end of the wall and that is able to eject a fluid jet intended to interact with one and/or the other gas stream(s), the said at least one duct comprising a terminal portion equipped at its free end with an outlet opening through which the fluid jet is ejected, characterized in that the terminal portion comprises successively a first straight duct portion aligned along an axis referred to as median axis and a second duct portion forming a bend in relation to the straight portion, the second portion having a free end provided with the outlet opening and is sufficiently close to the median axis of the first portion so as to impart to the terminal portion a reduced space requirement in the direction of formation of the bend.

The second portion forming a bend with small radial extension (transverse in relation to the medium axis) makes it possible to give the fluid jet originating from the outlet opening, easily and in controlled manner, the desired orientation (effective outlet angle) despite an available space of limited size.

Furthermore, this short bend formed in the terminal part of the duct or ducts makes it possible to effectively control the fluid jet that is ejected therefrom. The bend ensures an appropriate guidance of the jet by imparting speed distributions at discharge from the opening that have maximal speeds and a parallel flow.

The control actually would be less effective if the bend extended with an upright portion over an excessive distance and, in addition, the space requirement generated thereby would be increased.

By controlling the distance between the outlet opening and the median axis of the straight portion, the radial space requirement of the duct or ducts is brought under control.

This makes it possible easily to associate the duct or ducts with the wall of the jet engine despite numerous penalizing constraints (space requirement, environment . . . ).

The outlet opening or the outlet face of the duct comprising this opening should not be at a distance from the axis greater than twice the value of the radius of the first portion (or of its half-width or half-height) in order to keep to a reasonable space requirement. The distance is measured between the axis and the middle of the opening.

It will be noted that the second gas stream may be the surrounding air when the first stream is the secondary stream or correspond to the secondary stream when the first stream is the first stream.

According to one characteristic, the second portion forming a bend has a continuous curvature, that is to say that the outer bending radius of the bend is more or less constant over the entire extension thereof, from the upstream end of the bend in contact with the straight portion up to the downstream outlet end of the bend.

In other words, the bend does not show any abrupt variation of the bending radius on the outside.

Such a curved portion makes it possible to produce a fluid jet that proves to be particularly effective for attenuating the noise generated by the first gas stream coming out of the jet engine.

This may be explained by the fact that the fluid flow in the bend is deflected progressively and in controlled manner from its initial trajectory given by the median axis in order to achieve its final orientation.

It will be noted, furthermore, that the bending radius may be larger or smaller according to the application considered.

Thus, a small bending radius will impart a reduced axial space requirement (in a direction parallel to that of the median axis) in addition to the reduced radial space requirement.

A large bending radius will impart a greater axial extension, while retaining a reduced radial space requirement.

The progressive bend is formed, for example, by bending of a straight duct section.

According to another characteristic, the bend is formed by an upright duct portion connected to the straight portion along a connecting angle.

The bend thus shows an abrupt variation of bending radius on the outside.

The fluid flow inside the duct therefore is deflected abruptly by the bend, which results in disturbances in the flow and in the jet formed. The abrupt deflection results in overspeeds in the inner part of the bend, probably resulting from separations inside the ducts. These overspeeds may be favorable for generation of longitudinal vortexes and amplify the effects of the jets.

It will be noted that the upright portion may be truncated to a greater or lesser degree on one of its sides so as to be able to be connected easily to the first straight portion and without unreasonably increasing the space requirement.

Such a truncated portion takes on, for example, a wedge or triangle shape along a view in a plane containing longitudinal axis XX' of the jet engine and the median axis.

The upright portion may be joined to the first portion in different ways, in particular by welding.

According to one characteristic, the outlet opening is disposed in a plane that is more or less tangential to the first straight duct portion.

In this way the opening is arranged in the axial extension of the first portion (level with the duct portion), which makes it possible to control the deflection of the flow and not to increase the radial space requirement of the whole.

It will be noted that the outlet opening may be slanted in relation to the median axis without increasing the space requirement.

According to one characteristic, the said at least one duct is disposed in the thickness of the wall of the jet engine (size of the wall measured radially or transversely in relation to longitudinal axis XX').

This arrangement is made possible by the small thickness or radial extension of the duct or ducts configured in this way.

According to one characteristic, the second portion forming a bend imparts to the said at least one duct a slant toward longitudinal axis XX' of the jet engine along a penetration angle.

The choice of the orientation of the outlet opening in relation to the median axis of the first portion makes it possible to give the duct(s) the desired penetration angle.

This angle appears in a view in projection in a plane containing the longitudinal axis and the median axis.

According to one characteristic, the second portion forming a bend imparts to the said at least one duct a slant in relation to longitudinal axis XX' of the jet engine along a lateral angle.

The choice of the orientation of the outlet opening in relation to the median axis of the first portion makes it possible to give the duct(s) the desired lateral angle.

According to one characteristic, the second portion forming a bend imparts to the said at least one duct a dual slant according to a penetration angle and according to a lateral angle.

For a given orientation of the median axis of the first portion (this axis, for example, to be oriented along a penetration angle and/or a lateral angle), by bend imparts, through its orientation with regard to the median axis, both the final penetration angle and the final lateral angle desired.

It thus may be seen that the bend makes it possible to precisely adjust the direction of the fluid jet generated by the terminal portion of the duct or ducts.

According to one characteristic, the ducts are integrated into the wall, which makes it possible to reduce the space requirement.

According to one characteristic, the downstream end of the wall comprises a plurality of chevrons distributed around the periphery of the latter in order to form a mechanical acoustic attenuation device.

The chevrons interact with the gas stream originating from the downstream end where they are disposed, thus giving rise to vortexes that are propagated along the stream (in the longitudinal direction of the jet engine) and contribute to reducing the noise.

When the fluid ejection ducts are arranged with reference to the downstream end of the wall, the chevrons may be laid out at this same end in order to reinforce the effect of attenuation of the noise generated by the jet engine.

As a variant, the chevrons may be laid out at another downstream wall end that surrounds the outlet of another stream ejected from the jet engine.

According to another variant, the fluid ejection ducts and the chevrons may be integrated into the same downstream wall end, while another downstream wall end surrounding the outlet of another stream ejected from the jet engine also may be equipped with chevrons alone or with ducts alone or else with chevrons in cooperation with ducts.

According to one characteristic, the ducts are associated with chevrons that impart to the downstream end of the wall a jagged shape comprising a succession of peaks and valleys.

The fluidic jet coming out of each duct is associated with the longitudinal vortex generated at the associated chevron and thus reinforces its noise-reducing action.

The association of the fluid jets with the chevrons makes it possible:
  to extend the spatial impact of the chevrons, that is to say with identical effect, to have shorter chevrons (less penalizing in cruising) or with identical chevron size, to increase the effectiveness thereof, to create new spatial effects insofar as the jets interact with the propulsive jet in different positions starting from the trailing edge; this therefore makes it possible to have different pressure gradients, which may be favorable for the action of the jets by amplifying their penetration, for example.

The invention also has as an object an aircraft comprising at least one aircraft jet engine according to the brief presentation set forth above.

BRIEF DESCRIPTION OF THE DRAWINGS

Other characteristics and advantages will become apparent from the description that is going to follow, provided solely by way of non-limitative example and presented with reference to the attached drawings, on which:

FIG. 3g illustrates an implementation variant of the terminal duct part shown on FIG. 3a;

FIG. 4b illustrates a terminal duct portion according to an implementation variant of the terminal duct portion of FIG. 4a;

DETAILED DESCRIPTION

Figure 1:
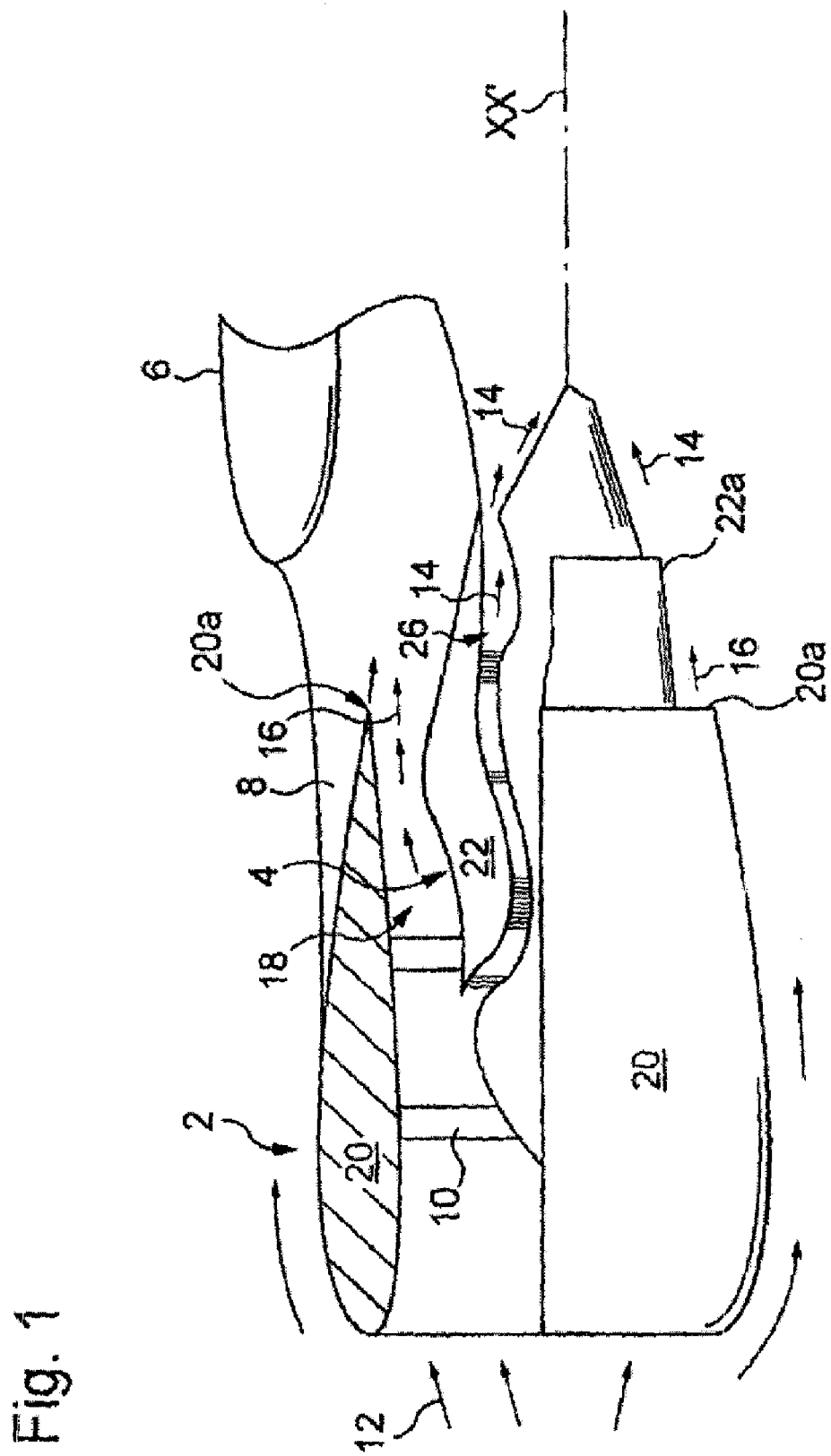
FIG. 1 is a general schematic view in longitudinal section of an aircraft jet engine in which only the upper part of the fan hood has been removed.

As shown in FIG. 1 and designated by the general reference marked 2, an aircraft jet engine nacelle envelops a turbomachine 4 and is installed under a wing 6 of an aircraft in known manner with an jet engine nacelle pylon 8.

The turbomachine 4 comprises a gas generator that drives a fan 10 mounted on the shaft of the generator, upstream from the latter along the longitudinal direction of the jet engine nacelle.

The nacelle has a revolution symmetry around the longitudinal axis XX'.

Air stream 12 that enters the nacelle, passes longitudinally through the latter, penetrates partially into gas generator 4 and participates in combustion.

Hot propulsive stream 14 ejected at the outlet of the generator is called primary stream.

The part of air stream 12 entering the nacelle and that does not pass through the gas generator is carried along by fan 10.

This cold propulsive stream 16, called secondary stream, flows in an annular passage 18 arranged concentrically in relation to primary stream 14.

This passage 18 is formed between an outer longitudinal wall 20 (nacelle hood) and an inner longitudinal wall 22 (engine hood) surrounding the gas generator.

Secondary stream 16 is ejected from the nacelle at downstream end 20a of outer wall 20, more or less along the longitudinal direction of the jet engine.

Inner longitudinal wall 22 defining the outer casing of the gas generator defines with central longitudinal part 24, constituting the core of the engine, another annular passage 26 through which primary stream 14 flows.

This stream more particularly is ejected at downstream end 22a of inner wall 22.

A fluidic device for reduction of the sound level of the jet engine according to the invention is applied to the nacelle of jet engine 2 of FIG. 1.

This device is arranged, for example, with reference to the more or less cylindrical exterior wall 20 (exterior hood) of the nacelle and which surrounds annular passage 18 through which secondary stream 16 is ejected.

It also may be arranged with reference to interior wall 22 (interior hood) of the nacelle that surrounds turbomachine 4 and at the end of which primary stream 14 is ejected.

It will be noted that a fluidic device may be provided at one and/or the other of the two concentric walls (exterior and interior hoods).

More particularly, the fluidic device according to the invention is associated with a so-called downstream end 20a and/or 22a of the wall in question, at the trailing edge thereof (also called outlet lip).

The fluidic device according to the invention is capable of generating, on command, a disturbance of the flow immediately downstream from the downstream end of the wall around the exterior periphery of the stream (primary or secondary) ejected through this end.

It will be noted that the fluidic device according to the invention simply may be added to an existing jet engine nacelle nozzle, without calling into question the whole design and manufacture thereof.

The fluidic disturbance modifies the manner in which the ejected stream meets the exterior stream (which is the air surrounding the nacelle when the ejected stream is the secondary stream) and interacts with the ejected stream in order to form vortexes that are propagated longitudinally downstream.

The aforementioned phenomenon has the purpose of reducing the noise generated by the jet engine equipped in this way, in particular during the phases of take-off and approach of the aircraft.

The device according to the invention may assume different forms of implementation and certain structures of the device are going to be described below.

Nonetheless, each of these structures provides the advantage of effectively reducing the noise generated by a large-size jet engine (for example, exterior ring diameter of the nacelle on the order of a meter).

Figure 2:
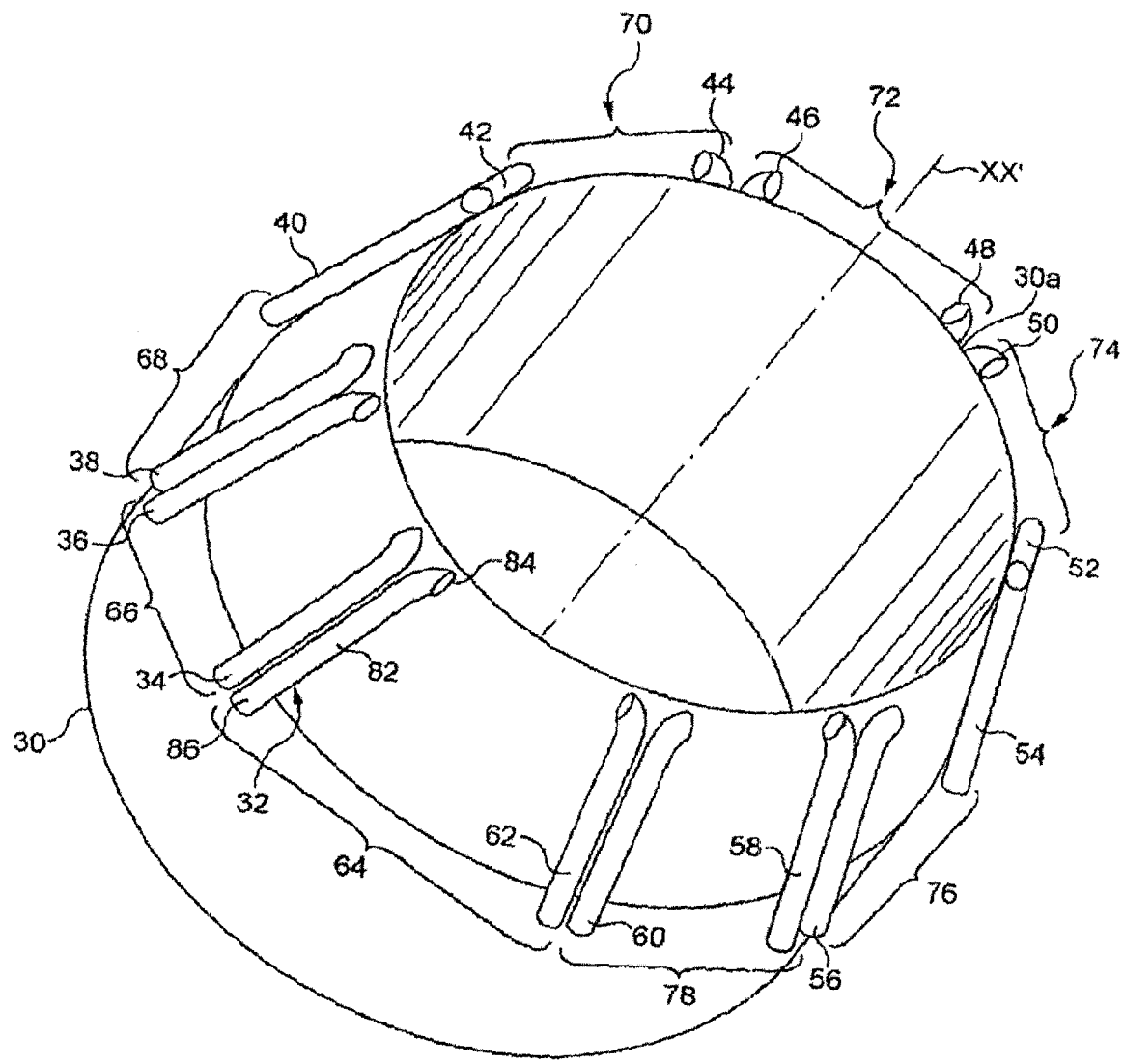
FIG. 2 is a schematic view in perspective of a nacelle wall downstream end equipped according to a first embodiment of the invention.

On FIG. 2, several fluidic devices according to a first embodiment of the invention are provided on one of the two nacelle walls shown in FIG. 1 and which here is referenced 30. The wall shown in FIG. 2 forms a nozzle in which there flows a first stream (primary or secondary) that is ejected at downstream end 30a of the wall along the direction given by axis XX'.

In this embodiment fluidic devices 32, 34, 36, 38, 40, 42, 44, 46, 48, 50, 52, 54, 56, 58, 60, 62 are, for example, regularly distributed around the exterior periphery of downstream end 30a of the wall, at the outlet ring, and are spaced apart from each other.

Each device takes on the form of a duct that is able to eject a fluid jet at downstream end 30a of the wall. According to the orientation given to the jet by the duct, the jet interacts with the first stream or the second outside stream that flows outside along wall 30 or else with the two streams if the jet is directed at the interface of the two streams.

As a variant, some ducts may be oriented toward the first stream while some others are oriented toward the second stream.

It will be noted that, in other embodiments, the devices may be integrated into the thickness of the wall or on the inner face thereof (inner periphery) that is in contact with the flow of the ejected stream (primary or secondary).

It also should be noted that the devices may be distributed differently according to the azimuth.

This makes it possible, for example, to take into account the presence of the jet engine nacelle pylon 8 that modifies the flow.

This non-homogeneous arrangement also makes it possible to take into account the directivity of the noise and the regulatory constraints concerning noise in relation to vicinity. In fact, it is preferable to limit the noise radiated toward the ground than the noise radiated skyward.

In the application shown on FIG. 2, the ducts of the devices are associated by pairs 64, 66, 68, 70, 72, 74, 76, 78 and converge toward one another within the same pair of ducts as described in international patent application WO2002/013243.

In this way, the jets produced by the ducts of the same pair converge and form a fluidic triangle of interaction.

The slant of the ducts gives the jets that originate therefrom a tangential speed component which, because of the interaction with the propulsive jet, brings about a rotation of the jets on themselves, in opposite direction for two convergent jets. This rotation may be favored by means such as those mentioned above. Furthermore, the aforementioned angle of convergence causes the two convergent jets to meet at short range, on the order of one quarter of the diameter of the nozzle.

When the implementation relates to the ring separating the cold exterior jet (secondary stream) and the hot central jet (primary stream), the rotation of the jets carries cold exterior air along to the interior of the propulsive jet between the convergent jets, hot air, on the contrary, coming out again outside the jets.

The result is a homogenization of the temperatures from the outlet of the nozzle, capable of contributing to the reduction of the noise generated by this nozzle. A heat-shield effect also is produced, likewise favorable for the reduction of the radiated noise.

In the example illustrated in FIG. 2, the pairs of ducts are distributed so that the duct converging in one direction directly juxtaposes the duct of the adjacent pair and which has an opposite convergence.

Nevertheless, the spacing between the tubes of the same pair as well as the spacing of the adjacent tubes of two different pairs will depend on the number of tubes with which the nozzle is to be equipped and the diameter of the latter. In fact, in the example illustrated, the nozzle comprises eight pairs (64, ..., 78) of pipes. It is obvious, of course, that here it is a matter of an exemplary implementation given by way of illustration, the number of pipes being able to be lesser or greater. The number of pairs of pipes added to the nozzle will depend in particular on the size of the jet engine, but also on the noise pollution of the jet engines.

Thus in order to reduce the noise linked to the propulsive jets of the jet engines at the time of the take-off phase or the approach phase of the airplane, a blast of compressed air is released through the air-supply ducts right up to the pipes distributed at the outlet ring of the said nozzle. The ring in question may be the one (interior ring) separating the hot stream (primary stream) and the cold stream (secondary stream), or the one separating the cold stream (secondary stream) and the ambient air (nacelle ring). By virtue of the positioning of the pipes at the outlet ring, as well as their distribution, the compressed-air jets are propelled away from the pipes according to convergence and penetration incidences, then disturbing the propulsive jet according to fluid interaction triangles in the direction of the flow.

The air jets constitute controlled jets. Connected to the high-pressure part of the jet engine, their supply is actuated only in phases where control is necessary (generally during take-off or landing phases). Beyond these phases, the fluidic devices according to the invention are made inactive by mere cutoff of the compressed air duct. The airplane equipped in this way shows no penalization in terms of drag or loss of thrust.

It will be noted that the jets may be activated independently of each other, in this way providing a particularly flexible system for disturbance of the ejected stream. Thus, a partial activation of the said jets may be considered: activation of the jets positioned on the top, the bottom, the right or the left of the said nozzle, thus modifying the directivity of the noise pollution.

According to another variant, the control jets may be activated in a non-steady manner in order to reduce the outputs of the control jets or to improve the control performances.

The composition of one of these fluidic devices now is going to be described, taking as an example device 32, since all the other devices are identical thereto in this embodiment.

Device 32 comprises a duct 80 that is connected, for example, via a pipe for supply of fluid, here of air (the pipe is not shown), to the high-pressure part of the jet engine.

Duct 80 comprises a terminal part 82 that is provided, at its free end, with an outlet opening 84. Supplied in this way with compressed air, the duct conveys this air to the outlet opening thereof where it is ejected in the form of a jet.

In the example shown on FIG. 2, the opening is of circular shape and the jet takes on a circular diameter. Nonetheless, other configurations for outlet openings are possible.

Figure 3A:
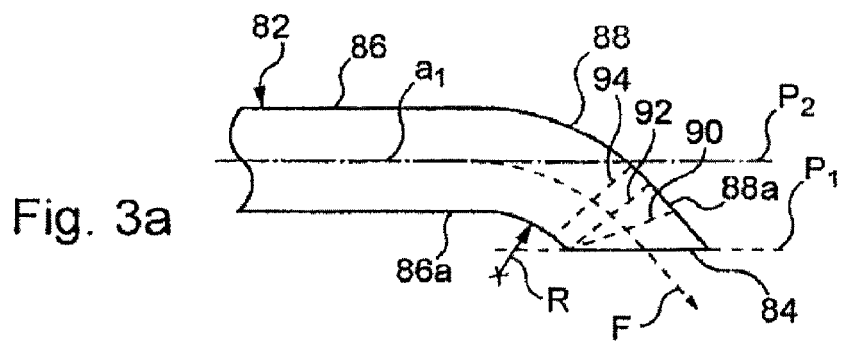
FIGS. 3a and 3b schematically illustrate an exemplary implementation of a terminal duct part according to the invention.

FIG. 3a illustrates terminal part 82 of duct 80 in a plane perpendicular to the plane in which outlet opening 84 is arranged.

The plane of the outlet opening may take on various orientations in space and longitudinal axis XX' is not necessarily included in this plane.

Figure 3B:
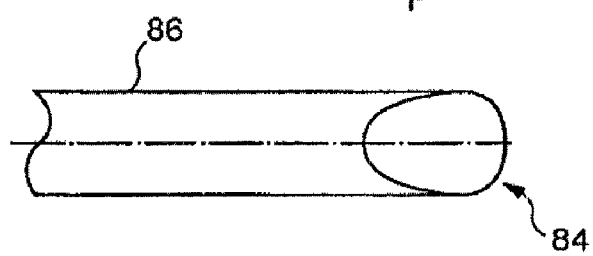

FIG. 3b shows this terminal part in a view from below and presents the passage section of outlet 84 seen from the front.

As shown on FIG. 3a, terminal part 82 more particularly comprises, successively from upstream to downstream, a first straight duct portion 86 and a second duct portion 88 forming a bend in relation to the first portion.

The first portion is aligned along an axis $a_1$, called median axis, which in the case of a cylindrical portion is merged with the axis of revolution of the cylinder.

When the duct portion is not cylindrical but assumes another shape (example: a flat or flared portion so as to produce a more or less flat jet), this axis is placed in a median plane of the portion (the median plane is perpendicular to the plane of FIG. 3a).

The fluid flow circulating in the first portion is directed according to this axis.

The second portion 88 forms a bend for deflecting the flow from its axial trajectory. This bend extends over a short distance starting from a downstream end 86a of the first portion up to the free end of the second portion that is provided with outlet opening 84.

Terminal part 82 bent in this way is formed from a straight duct portion an end portion of which is bent in the desired direction.

In this way a continuous curvature is given to the terminal part of duct 80.

The free end of the curved terminal portion then is beveled in order to form outlet opening 84 with the desired angular orientation in relation to axis $a_1$ and at a given distance from this axis.

In the example illustrated on FIG. 3a, opening 84 is located in a plane P1 that is perpendicular to the plane in which the bend extends (plane of the Figure). Plane P1 is parallel to a plane P2 containing axis $a_1$ and which is perpendicular to the plane in which the bend extends.

Thus, the free end of the terminal part has been shaped obliquely in relation to the direction of extension so as to reduce the space requirement generated by the curvature.

Moreover, the outlet opening is placed a short distance from axis $a_1$ in order to reduce the space requirement of the terminal part in the direction of extension of the bend.

The distance is measured between the center of the outlet opening and axis $a_1$.

This distance generally ranges between one and two radii of the tube forming straight portion 86. For non-cylindrical ducts, the reference dimension will be an equivalent dimension of the transverse half-width type . . . .

Arrow F, at discharge from the opening, gives the direction according to which the fluid flow has been diverted by the bend.

This direction is parallel to the direction of extension of outside wall 88a of the bend.

It will be noted that the curvature of the bend may be marked to a greater or lesser degree, that is to say that bending radius R may be of small or large value according to the intended application and, in particular, according to the length available for associating the bend with the wall of the jet engine.

Control of the curvature makes it possible to choose the direction of the flow and therefore of the jet formed at the outlet opening.

Thus, according to the direction in which the bend is formed in space, the curvature makes it possible to impart to terminal part 82 of the duct a lateral angle, a penetration angle or a combination of these two types of angle.

Figure 3C:
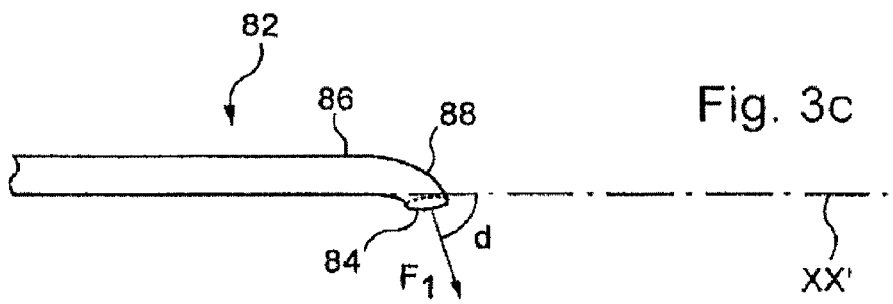
FIGS. 3c and 3d schematically illustrate different spatial orientations of the terminal duct part shown on FIGS. 3a and 3b.
Figure 3D:
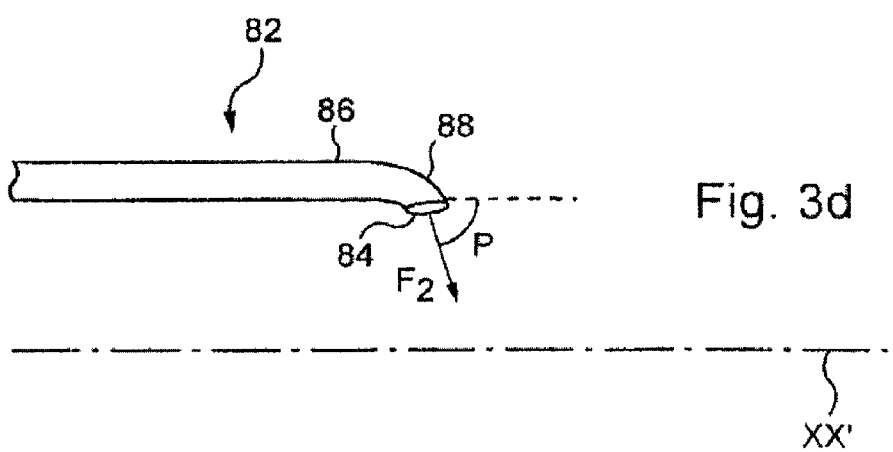

Terminal part 82 of duct 80 and of each of the ducts of FIG. 2 is curved in a direction that imparts to the ducts both a lateral angle d in relation to longitudinal axis XX' (see this angle in FIG. 3c) and a penetration angle p in the direction of axis XX' (see this angle on FIG. 3d). The lateral angle makes it possible to have the two ducts of the same pair converge toward one another. As for the penetration angle, it makes it possible to slant the jet originating from the duct on axis XX' so that it penetrates (to a greater or lesser degree according to the slant selected) into the gas stream ejected by the nozzle.

Figure 3E:
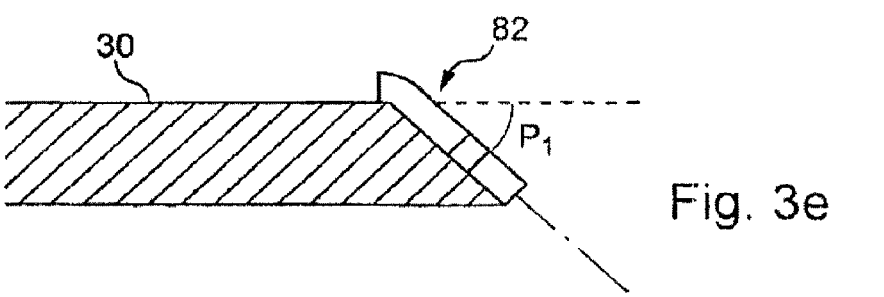
FIG. 3e schematically illustrates a possible arrangement of a terminal duct part on the trailing edge of the jet engine nozzle.

It will be noted that the ducts may be arranged following the slant of the trailing edge, as shown schematically on FIG. 3e, which already gives them a first penetration angle p1 to which the angle imparted by the bend is added.

It likewise should be noted that the penetration angle may vary from one duct to another or only for some ducts, so as to be able to locally vary the orientation of the jet according to specific circumstances (space requirement, directivity of noise pollution . . . ).

Figure 3F:
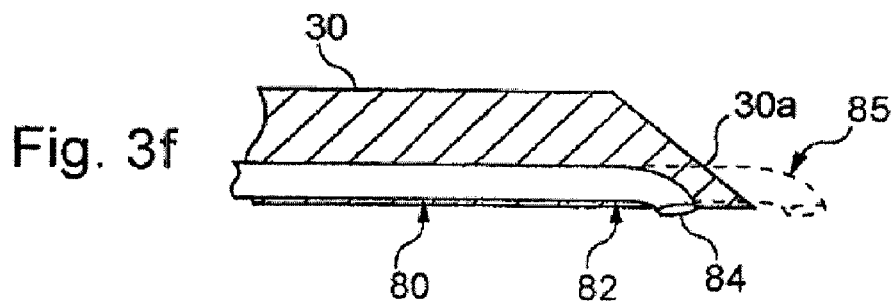
FIG. 3f schematically illustrates the integration of a terminal duct part into the interior of a jet engine nozzle wall.

Alternatively, the ducts may be disposed parallel to the direction of extension of the wall of the jet engine, with no penetration angle, for example being arranged in the thickness of the wall of the jet engine (see FIG. 3f).

On FIG. 3f, there also has been shown according to a variant (dotted line), terminal part 85 of the duct that was extended so as to open out axially beyond downstream end 30a of the wall, without, however, imparting a radial space requirement greater than that of terminal part 82.

As a variant, the bend of terminal part 82 of duct 80 of FIG. 3a may be formed in a direction such that the plane containing outlet opening 84 passes through longitudinal axis XX' of the jet engine (direction perpendicular to axis XX' and tangential to the periphery of the wall).

In this way, orientation F given to the fluid jet originating from the duct will correspond only to a lateral angle in relation to axis XX'.

According to another variant, the bend only may be formed extending toward the XX' axis so that orientation F of the fluid jet corresponds only to a penetration angle.

As shown on FIG. 3a, other orientations for outlet openings may be considered such as the one given by opening 90 (dotted line) that is closer to axis $a_1$, which reduces the axial space requirement of the bend.

Openings 92 and 94 are other examples showing bends even shorter and therefore with smaller space requirement.

It will be noted that the actual angle of deflection is not exactly the outlet geometric angle of the duct. Moreover, the shorter the ducts, the smaller the outlet angle in relation to the geometric angle.

The continuous shape of the curvature makes it possible to produce a deflected fluid jet by ensuring an overspeed in the outer portion of the curvature. This overspeed is favorable to the creation of longitudinal vortexes that play a beneficial role in acoustic attenuation.

Figure 3G:
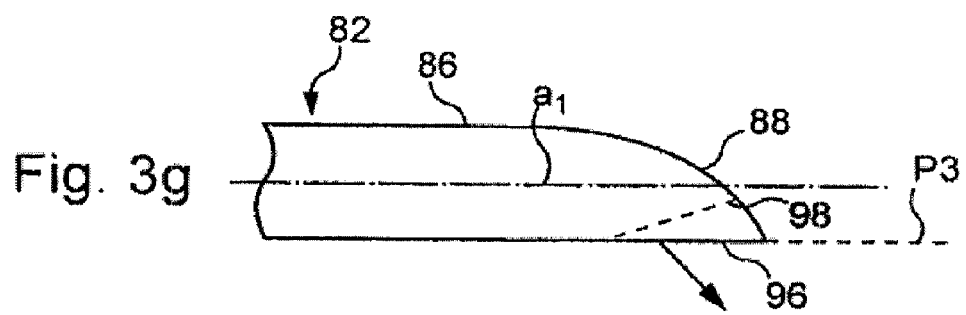

FIG. 3g illustrates an embodiment variant in which outlet opening 96 is formed level with the free end of the bend once it is shaped, and is disposed in a plane P3 parallel to plane P1 of FIG. 3a and that is tangential to the outer wall of first straight portion 86.

The outlet opening designed in this way is closer to axis $a_1$ than opening 84 of FIG. 3a and therefore gives a greater compactness to the duct (opening appearing in the outer casing defined by the duct and therefore in the space requirement generated thereby), while making it possible to direct the fluid flow in controlled manner.

It will be noted that alternatively the outlet opening may be arranged in a plane oblique in relation to plane P3, as opening 98, in order to further shorten the bend and therefore the space requirement thereof.

Figure 4A:
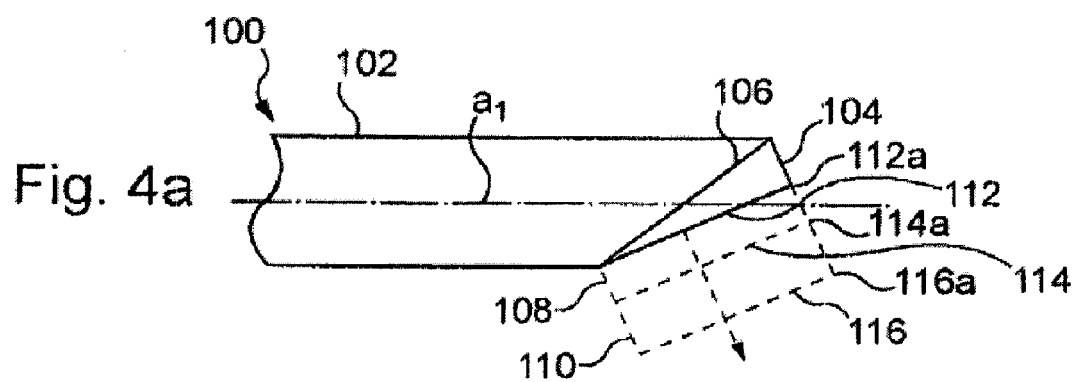
FIG. 4a schematically illustrates a terminal duct portion according to another embodiment of the invention.
Figure 4B:
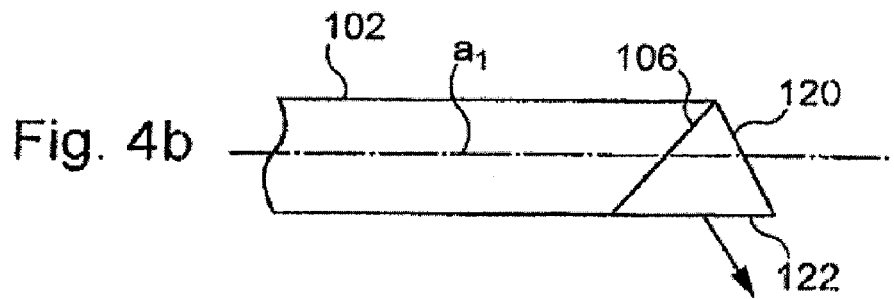

FIGS. 4a and 4b illustrate two variants of the same embodiment of the invention in which the second duct portion of the terminal part is connected to the first straight portion forming a bend with a sharp edge in relation thereto and that extends over a short distance.

As shown on FIG. 4a, terminal part 100 of the duct comprises a first straight duct portion 102 with median axis $a_1$ and a second duct portion 104 that comprises an upright portion connected to the first portion at a mating or oblique connection surface 106. Assembly of the two portions is performed, for example, by welding.

It will be noted that prior to undertaking joining of the two portions, first portion 102 is beveled at its free end so as to give it the beveled shape of mating surface 106.

The second straight portion also is shaped, for example in the form of a wedge (in profile view), so as to give it the very shortened shape of FIG. 4a.

Nonetheless, the second straight portion may be longer as shapes 108 and 110 illustrate in dotted lines on FIG. 4a.

The outlet opening of each of these second portions, namely opening 112, 114, 116, thus is arranged at a greater and greater distance from axis $a_1$ without, however, excessively penalizing the overall space requirement of the duct configured in this way.

The same features and advantages as those described with reference to FIGS. 3a to 3g also apply here, with the exception of the impact of the bend on the formation of the jet and on its characteristics and they therefore will not be repeated.

In fact, the abrupt nature of the bend results in different effects on the inner flow in the duct and on the formation of the jet.

In particular, the fluid overspeed induced by the curvature occurs here in the inside part of the curvature.

It will be noted that the part of the outlet opening located on the outside edge of the bend at its outside tip, and that is referenced 112a for opening 112, 114a for opening 114 and 116a for opening 116, makes it possible to set the fluid separations locally.

In this way, the jet formed is less diffuse and has a longer life and therefore an increased effectiveness.

The orientations of the outlet openings in space are all identical on FIG. 4a, but of course may vary as has been explained with reference to FIGS. 3a to 3g, so as to impart different types of angles (lateral angle, penetration angle, angle having a lateral-angle component and a penetration-angle component) to the duct bent in this way.

FIG. 4b illustrates an implementation variant in which the second portion of duct 120 that is connected to mating surface 106 of the free end of first straight portion 102 also forms a wedge in a side view.

Nonetheless, the wedge is more voluminous and outlet opening 122 of the bend is disposed in the alignment of one of the walls of first straight portion 102, thus being tangential thereto.

In this way, bend 120 does not extend laterally (transversely) in relation to axis $a_1$ beyond the outer casing of the duct, which therefore does not increase the radial space requirement of the duct.

Moreover, by not projecting in relation to the outer radial casing of the duct, the bend does not disturb the surrounding flow.

The features and advantages set forth for the configuration of FIG. 4a also apply here, except for what relates to the different positions of the outlet opening in relation to axis $a_1$, and they therefore will not be repeated.

In the preceding explanation with reference to FIGS. 2 to 4b, the outlet openings of the ducts always have been shown oriented downward (in the direction of axis XX') and/or toward the side (in the direction of other outlet openings).

The ducts according to the invention, however, may be bent in a direction allowing the outlet openings, or only some of them, to be oriented toward the outside of the nozzle (radially at a distance from axis XX') and not inward so as to interact more with the gas stream outside the nozzle.

It will be noted that the outlet openings of the ducts also may be slanted two by two, toward one another, within the same pair of ducts so as to converge.

It should be noted that the outlet openings of the arrangements of FIGS. 2 to 4b (or the outlet faces of the ducts that comprise these openings) should not be too far away from median axis $a_1$ of the straight duct portion located upstream from the bend.

A distance in the region of twice the value of the radius of the upstream duct portion (or around twice the half-width or half-height on the Figure, if the straight portion is not cylindrical) makes it possible to achieve a satisfactory reduced space requirement and an effective fluidic control of the jet.

When the outlet openings are tangential to the aerodynamic lines of the duct in its straight portion (opening 96 on FIG. 3g, opening 122 on FIG. 4b) or at the very least fall within its outer casing (opening 98 on FIG. 3g, opening 122 on FIG. 4a), losses in aerodynamic performances are minimized.

The outlet openings may extend beyond the aerodynamic lines of the straight portion of the duct (beyond the lower part of this portion on the Figures) as on FIGS. 3a and 4a, remaining in an outlet plane parallel to axis $a_1$ (opening 84) or being slanted in relation to this axis (openings 90, 114, 116).

In general, the outlet openings extend at most over a distance of a radius (or of a half-width or half-height) starting from the lower part of the straight duct portion so as to retain a reduced space requirement and so as not to penalize aerodynamic performances.

It will be noted that when the openings are oriented obliquely, their distance to axis $a_1$ or to the lower aerodynamic line of the duct is measured in relation to their center.

Figure 5:
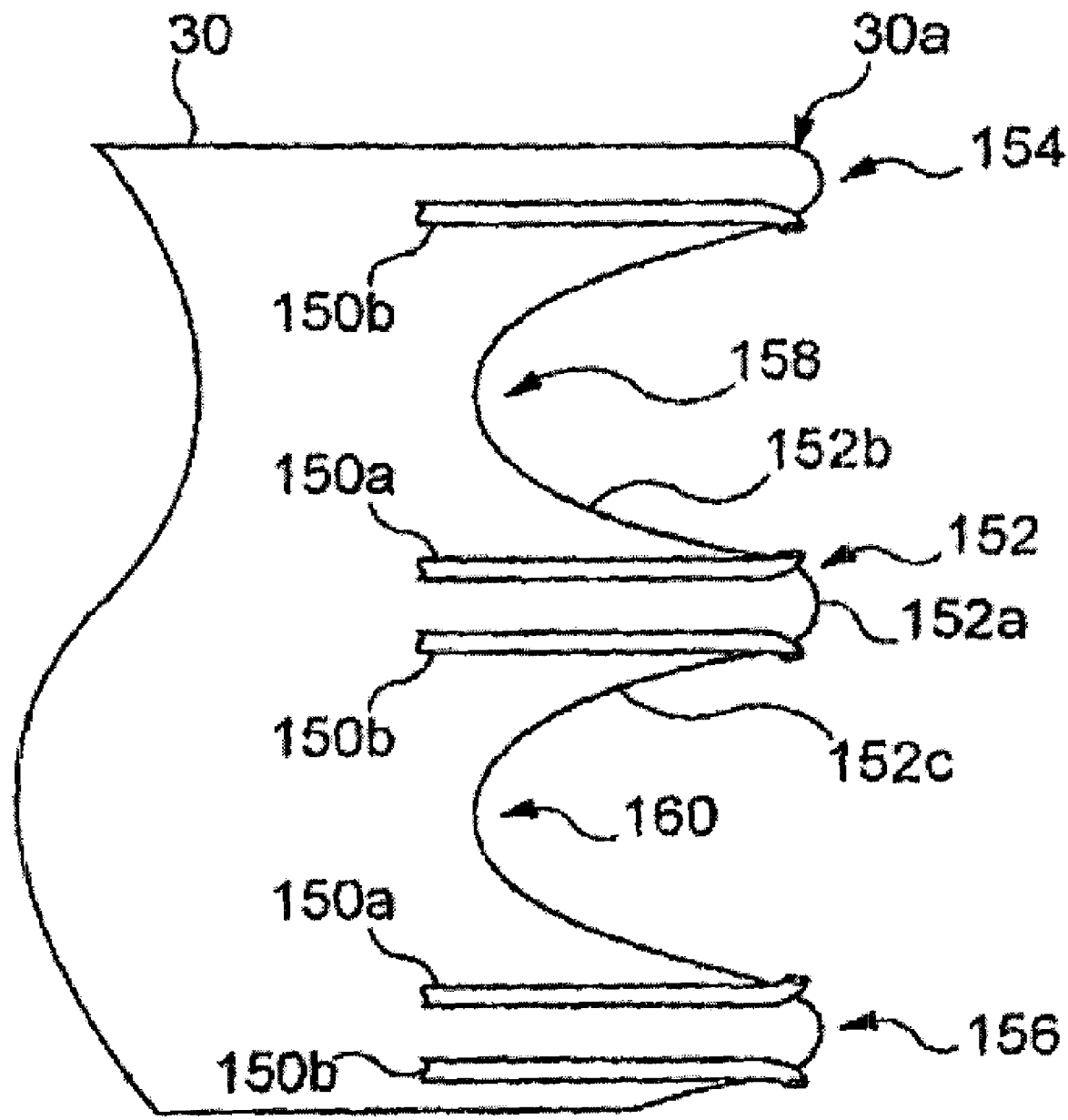
FIG. 5 illustrates another embodiment of the invention in which bent ducts are associated with chevrons.

On FIG. 5 there has been shown very schematically the arrangement of two ducts 150a, 150b with reference to a chevron 152 arranged at the downstream end of wall 30 of the nacelle so as, in particular, to amplify the effects produced by the chevron.

The downstream end comprises a plurality of successive chevrons only three of which 152, 154, 156 are shown and each chevron may be equipped with a fluidic device comprising two ducts 150a, 150b.

In this embodiment, two ducts 150a, 150b are disposed parallel to the median of the chevron that passes through the peak of the latter.

In this way, the outlet openings of the emerging ends of the ducts are located at peak 152a of the chevron (the ends of the ducts are flared at the peak) and on command eject a fluid jet on both sides of the peak.

It will be noted that other arrangements of ducts may be considered with reference to the chevrons.

Thus, for example, the ducts in their straight portion may be arranged along slanted portions 152b, 152c of the chevron (these slanted portions respectively connect peak 152a of the chevron to valleys 158, 160 separating two chevrons), their outlet opening always being oriented toward the outside of the chevron.

Moreover, the outlet openings of ducts 150a, 150b of FIG. 5 alternatively may be oriented toward one another instead of being back to back.

Oriented in this way, the openings produce jets that extend, as it were, the effects of the chevrons.

According to another variant, the outlet openings of other ducts may be directed on a valley between two chevrons, replacing or in addition to the arrangement of FIG. 5.

It will be noted that the different arrangements of FIGS. 3a to 4b also may be associated with chevrons to cooperate therewith.

The invention claimed is:
1. An aircraft jet engine, comprising:
a wall surrounding a first gas stream that is ejected at a downstream end of the wall along a longitudinal axis, a second gas stream flowing outside the wall in a direction of ejection of the first gas stream;
at least one duct arranged at a periphery of the downstream end of the wall and configured to eject a fluid jet to interact with the first or the second gas stream, the at least one duct comprising a terminal part including at a free end thereof an outlet opening through which the fluid jet is ejected, wherein the terminal part successively comprises a first straight duct portion aligned along a median axis and a second duct portion forming a bend in relation to the straight portion, the second duct portion including the free end including the outlet opening and being sufficiently close to the median axis of the first portion so as to impart to the terminal part a reduced space requirement in a direction of formation of the bend, and the outlet opening of the second duct portion is at a distance measured between the median axis and a middle of the outlet opening which is not greater than twice a value of a radius of the first duct portion.

2. An aircraft jet engine according to claim 1, wherein the second portion forming a bend has a continuous curvature.

3. An aircraft jet engine according to claim 1, wherein the bend is formed by an upright duct portion connected to the straight portion along a connecting angle.

4. An aircraft jet engine according to claim 1, wherein the outlet opening is disposed in a plane that is tangential to the first straight duct portion.

5. An aircraft jet engine according to claim 1, wherein the at least one duct is disposed in the thickness of the wall of the jet engine.

6. An aircraft jet engine according to claim 1, wherein the second portion forming a bend imparts to the at least one duct a slant toward the longitudinal axis of the jet engine along a penetration angle.

7. An aircraft jet engine according to claim 1, wherein the second portion forming a bend imparts to the at least one duct a slant in relation to the longitudinal axis of the jet engine along a lateral angle.

8. An aircraft jet engine according to claim 6, wherein the second portion forming a bend imparts to the at least one duct a dual slant according to a penetration angle and according to a lateral angle.

9. An aircraft jet engine according to claim 1, wherein each duct includes chevrons that impart to the downstream end of the wall a jagged shape comprising a succession of peaks and valleys.

10. An aircraft comprising an aircraft jet engine according to claim 1.

11. An aircraft jet engine according to claim 1, further comprising a plurality of the ducts arranged at the periphery of the downstream end of the wall.

12. An aircraft jet engine according to claim 11, wherein the plurality of the ducts are arranged in pairs, the outlet openings of the ducts facing the outlet openings of the other of the ducts in the respective pairs.

13. An aircraft jet engine according to claim 1, wherein an end of the duct opposite the free end is outside of the wall.

14. An aircraft jet engine according to claim 1, wherein the second duct portion forms a single bend in relation to the first straight duct portion.

* * * * *